2,957,018

CYANOETHYL ESTERS OF PHOSPHOROAMIDIC ACIDS

Joseph W. Baker, Nitro, W. Va., assignor to Monsanto Chemical Company, St. Louis, Mo., a corporation of Delaware No Drawing. Filed Oct. 24, 1957, Ser. No. 692,048

7 Claims. (Cl. 260—461)

This invention relates to new and useful compositions of matter. More particularly it relates to cyanoethyl esters of a phosphoroamidic acid. The compounds may be represented by the general formula

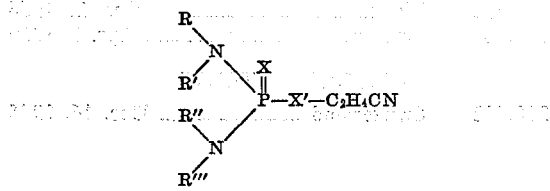

where R and R'' are acyclic radicals, R' and R''' are selected from the group consisting of hydrogen and acyclic radicals and X and X' are selected from the group consisting of oxygen and sulfur, at least one of X and X' being oxygen. Examples of suitable acyclic radicals are alkyl, such as methyl, ethyl, propyl, isopropyl, butyl and the like, and alkenyl, such as allyl.

The new compounds may be formed by reacting one molecular proportion of 2-cyanoethanol with one molecular proportion of the phosphoroamidic chloride in the presence of a hydrogen chloride acceptor such as pyridine or triethylamine. Alternatively, they may be prepared by condensing a phosphoroamido acid with acrylonitrile in the presence of a catalyst as described in U.S. Patent No. 2,611,728. Illustrative of the invention are: 2-cyanoethyl tetramethylphosphorodiamidate, 2-cyanoethyl tetraethylphosphorodiamidate, 2-cyanoethyl tetrapropylphosphorodiamidate, 2-cyanoethyl dibutylphosphorodiamidate, 2-cyanoethyl tetrabutylphosphorodiamidate, 2-cyanoethyl tetramethyldiamidophosphorothioate, 2-cyanoethyl tetraethyldiamidophosphorothiate, 2-cyanoethyl tetrapropyldiamidophosphorothioate, 2 - cyanoethyl dibutyldiamidophosphorothioate, 2 - cyanoethyl tetraallylphosphorodiamidate, 2-cyanoethyl tetraallyldiamidophosphorothioate and 2-cyanoethyl tetraallyldiamidophosphorodithioate.

The invention is further illustrated by the following examples without being limited thereto.

Example 1

To a suitable reaction vessel equipped with a stirrer, reflux condenser and thermometer was charged 68.2 parts by weight (substantially 0.4 mole) of tetramethylphosphorodiamidic chloride, [(CH₃)₂N]₂POCl, 29.2 parts by weight (substantially 0.41 mole) of 2-cyanoethanol and 60.7 parts by weight of triethylamine. The mass was heated slowly to 75° C. and then heated at 75° C. to 85° C. over a period of about 2½ hours with constant agitation. To the so heated mass was added and intimately mixed 20 parts by weight of triethylamine and the mass heated at about 85° C. for 3½ hours. The mass was cooled and filtered and the salt cake residue washed with two successive 54 parts by weight portions of anhydrous diethylether. The respective washings and original filtrate were combined and admixed with 521 parts by weight of chloroform. The mixture so obtained was then washed successively with 100 parts by weight of a 5% aqueous sodium carbonate solution and with 75 parts by weight of water and the washings discarded. The organic residue was subjected to vacuum distillation to remove the solvents (105° C./10 mm.) leaving 77.5 parts by weight of 2-cyanoethyl tetramethylphosphorodiamidate, a reddish colored oil soluble in acetone, benzene, chloroform, ethyl alcohol and ethyl acetate.

Example 2

In a 500 ml. round bottomed flask fitted with stirrer, condenser and thermometer was charged 55.5 parts (0.2 mole) of tetrapropylphosphorodiamidic chloride, 14.7 parts (0.2 mole) of 2-cyanoethanol and 15.3 parts (0.3 mole) of pyridine and the mixture heated to reflux (120–130° C.) for 8 hours. After cooling, the precipitate which formed was filtered. The filtrate was dissolved in 300 ml. of chloroform and the solution washed with 5% sodium carbonate (100 ml.) and water (75 ml.). Thereafter, the solvents were removed by stripping to 110° C. at 12 mm. vacuum. The 2-cyanoethyl tetrapropylphosphorodiamidate so obtained was a dark brown liquid soluble in ethyl acetate, chloroform and benzene but insoluble in heptane and water. Analysis gave 12.9% phosphorus and 10.0% nitrogen as compared to 9.8% phosphorus and 13.2% nitrogen calculated for $C_{15}H_{32}N_3O_2P$.

Example 3

A 500 ml. flask fitted with stirrer, condenser and thermometer was charged with 71.0 parts (0.41 mole) of tetramethylphosphorodiamidothioic chloride, 29.4 parts (0.4 mole) of 2-cyanoethanol and 60.7 parts (0.6 mole) of triethylamine. The mixture was heated for 3 hours at 75–85° C. and an additional 20 parts (0.2 mole) of triethylamine added. Heating was then continued for 10½ hours at 85° C., the product was dissolved in 350 ml. of chloroform and the solution washed with 5% sodium carbonate solution and water as in Example 1. The solvents were removed by stripping to 105° C. under 10 mm. vacuum and the O-(2-cyanoethyl) tetramethyldiamidophosphorothioate remaining was filtered through attapulgus clay. Analysis gave 19.8% nitrogen and 16.3% phosphorus as compared to 19.0% nitrogen and 14.0% phosphorus calculated for $C_7H_{16}N_3OPS$.

Example 4

2-cyanoethyl tetraallylphosphorodiamidate was prepared by employing 27.5 parts (0.1 mole) of tetraallylphosphorodiamidic chloride, 7.1 parts (0.1 mole) of 2-cyanoethanol and 20 parts (0.2 mole) of triethylamine. An additional 10 parts of triethylamine was added after heating for 3 hours at 50–60° C. The mixture was then washed and the solvents removed as shown in Example 3. The resulting product was a dark brown liquid soluble in acetone, benzene, chloroform, ethanol and ethyl acetate but insoluble in water. Analysis gave 10.7% phosphorus and 10.3% nitrogen as compared to 10.0% phosphorus and 13.6% nitrogen calculated for $C_{15}H_{24}N_3O_2P$.

The esters of this invention are useful for destroying or controlling vegetation as disclosed in application Serial No. 614,364, filed October 8, 1956, of which this application is a continuation-in-part. Moreover, the product of Example 1 is an effective flame-proofing agent of acrylonitrile polymers as disclosed in Graham application Serial No. 615,740, filed October 15, 1956, now U.S. Patent No. 2,881,147, granted April 7, 1959.

It is intended to cover all changes and modifications of the examples of the invention herein chosen for purposes of disclosure which do not constitute departures from the spirit and scope of the invention.

What is claimed is:

1. As a new composition of matter a compound of the formula

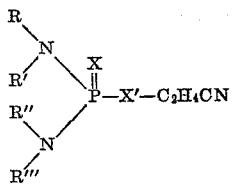

where R and R'' are selected from a group consisting of lower alkyl and lower monoolefinic hydrocarbon radicals, R' and R''' are selected from the group consisting of hydrogen, lower alkyl and lower mono-olefinic hydrocarbon radicals and X and X' are selected from the group consisting of oxygen and sulfur at least one being oxygen.

2. A composition according to claim 1 wherein each of R, R', R'' and R''' is a lower alkyl group.

3. A composition according to claim 1 wherein each of R, R', R'' and R''' is a lower mono-olefinic hydrocarbon group.

4. A composition of matter of the formula

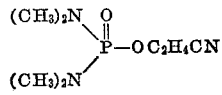

5. A composition of matter of the formula

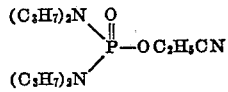

6. A composition of matter of the formula

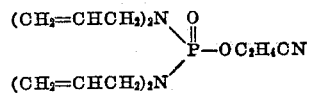

7. A composition of matter of the formula

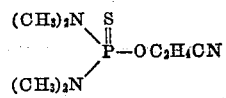

References Cited in the file of this patent

UNITED STATES PATENTS

| | | |
|---|---|---|
| 2,160,842 | Drefus | June 6, 1939 |
| 2,634,823 | Drake et al. | Apr. 14, 1953 |
| 2,725,371 | Coover et al. | Nov. 29, 1955 |
| 2,765,252 | Pianka | Oct. 2, 1956 |
| 2,881,147 | Graham | Apr. 7, 1959 |

FOREIGN PATENTS

| | | |
|---|---|---|
| 310,412 | Switzerland | Dec. 16, 1955 |